(12) United States Patent
Sakane et al.

(10) Patent No.: US 8,672,819 B2
(45) Date of Patent: Mar. 18, 2014

(54) TILT DEVICE

(75) Inventors: Kazuhiro Sakane, Obu (JP); Yuko Kamata, Toyota (JP)

(73) Assignees: Sankei C and C Corporation, Obu-shi (JP); Toyota Jidosha Kabushiki Kaisha, Toyota-shi (JP); Tokai Kyohan Co., Ltd., Nagoya-shi (JP); Shoho Ironworks Co., Ltd., Nagoya-shi (JP)

( * ) Notice: Subject to any disclaimer, the term of this patent is extended or adjusted under 35 U.S.C. 154(b) by 959 days.

(21) Appl. No.: 12/745,792

(22) PCT Filed: Nov. 16, 2009

(86) PCT No.: PCT/JP2009/069445
§ 371 (c)(1),
(2), (4) Date: Jun. 2, 2010

(87) PCT Pub. No.: WO2010/061749
PCT Pub. Date: Jun. 3, 2010

(65) Prior Publication Data
US 2010/0247262 A1    Sep. 30, 2010

(30) Foreign Application Priority Data

Nov. 27, 2008   (JP) ................................. 2008-302421

(51) Int. Cl.
B23Q 3/157    (2006.01)
B23Q 3/155    (2006.01)
B23C 1/14     (2006.01)
B23Q 11/00    (2006.01)

(52) U.S. Cl.
USPC ................. 483/30; 483/1; 409/168; 409/167; 409/224; 409/221; 409/137; 269/55

(58) Field of Classification Search
USPC ........... 483/30; 409/168, 167, 224, 221, 137; 269/55, 71, 60, 289 R, 291, 136, 138
See application file for complete search history.

(56) References Cited

U.S. PATENT DOCUMENTS 3,738,226 A * 6/1973 Dickerson ........................ 409/77
5,158,739 A * 10/1992 Gente et al. .................... 376/260
(Continued)

FOREIGN PATENT DOCUMENTS

JP      63 52952       3/1988
JP      9 300151       11/1997
(Continued)

OTHER PUBLICATIONS

Machined Translation of JP 2001-009653A.*

*Primary Examiner* — Sarang Afzali
(74) *Attorney, Agent, or Firm* — Oblon, Spivak, McClelland, Maier & Neustadt, L.L.P.

(57) ABSTRACT

In the course of a machining of a workpiece with a tool, a drive spindle with a tilt table secured thereto of a tilt device provided on a work table of a machining center is rotated by a direct drive motor to control the relative angular position between the tool and the workpiece, and within a predetermined period of time in the course of a machining, the direct drive motor is rotated at a high speed with a spindle head and the work table of the machining center kept away to rotate the drive spindle and hence, the tilt table at a high speed, so that chips and cutting lubricant can be shaken from the workpiece and the tilt table.

5 Claims, 5 Drawing Sheets

(56) References Cited

U.S. PATENT DOCUMENTS

| | | | |
|---|---|---|---|
| 7,155,826 B2 * | 1/2007 | Wehrfritz | 29/898.09 |
| 7,591,620 B2 * | 9/2009 | Schmidt et al. | 409/235 |
| 2007/0225139 A1 * | 9/2007 | Kojima et al. | 483/1 |

FOREIGN PATENT DOCUMENTS

| | | |
|---|---|---|
| JP | 2001 9653 | 1/2001 |
| JP | 2002 79431 | 3/2002 |
| JP | 2003 260631 | 9/2003 |

* cited by examiner

TILT DEVICE

TECHNOLOGICAL FIELD

The present invention relates to a tilt device equipped on a machine tool for rotating an attached workpiece to a desired angular position.

BACKGROUND ART

As tilt devices of this kind in the prior art, there has been known one which is disclosed in, for example, Patent Document 1. In the tilt device described in Patent Document 1, a pair of pivot shafts 21A, 21B with a common pivot axis O are outwardly supported in rising portions which are at opposite sides of a tilt table 20 taking a U-letter shape, and the pivot shafts 21A, 21B are supported by a pair of support sections 11a, 11b upstanding on a support table, through bearings 14A, 14B. The tilt table 20 is provided thereon with a turn table 25 which detachably supports a pallet 26 to attach a workpiece W thereon and which rotates about an axis perpendicular to the pivot axis O. The pivot shafts 21A, 21B are rotated by servomotors 33A, 33B through worms 32 and worm wheels 31, and the rotational angle is detected by an encoder 27 attached to an extreme end of the pivot shaft 21B to be feedback controlled.

PRIOR ART DOCUMENT

Patent Document

Patent Document 1: JP2001-9653 (paragraphs [0012]-[0016], FIGS. 1-4)

SUMMARY OF THE INVENTION

Problems to be Solved by the Invention

In the tilt device in the aforementioned prior art, because the pivot shafts 21A, 21B are rotationally driven by the servomotors 33A, 33B through the worms 32 and the worm wheels 31, the device itself becomes large, and particularly, becomes large in a radial direction to interfere with a tool, whereby the machining area is restricted. Further, problems arise that because chips generated as a result of machining a workpiece with a tool are accumulated on the workpiece and the tilt table, the machining accuracy is lowered, or that because the machined workpiece is unloaded from the tilt device with chips and coolant adhered thereto, much time and labor are required for chip removal, and coolant is dispersed. Further, where distributors for supplying and discharging pressurized oil with respect to jigs which hold a workpiece provided on the tilt table 20 is provided on the axes of the pivot shafts 21A, 21B, the device becomes further large in the radial direction.

The present invention has been made in order to solve such drawbacks in the prior art and is to provide a tilt device which rotates a tilt table by a direct drive motor to control the relative position between a tool and a workpiece and which rotates the tilt table at a high speed by the direct drive motor in a predetermined period of time in the course of a machining to shake chips from the workpiece.

Measures for Solving the Problems

In order to solve the aforementioned problems, the feature in construction of the invention in a first aspect resides in a tilt device secured onto a work table of a machine tool wherein a spindle head rotatably supporting a tool spindle and the work table to which a workpiece is detachably attached are relatively moved to machine the workpiece with a tool attached to the tool spindle, the tilt device being characterized by comprising a support pedestal secured on the work table; a drive spindle supported by a front bearing and a rear bearing in the support pedestal rotatably about a pivot axis; a distributor provided on the axis of the drive spindle for distribution of pressurized oil; a direct drive motor provided with a stator fixedly fitted in a retention bore which is formed coaxially of the pivot axis between the front bearing and the rear bearing in the support pedestal and a rotor fixedly fitted on the drive spindle; a tilt table secured to the drive spindle for detachably attaching the workpiece thereto; and a controller for controlling the relative angular position between the tool and the workpiece by rotating the drive spindle by the operation of the direct drive motor and for rotating the tilt table at a high speed to shake out chips by rotating the direct drive motor at a high speed with the spindle head and the work table kept away in a predetermined period of time in the state that the workpiece is attached on the tilt table.

The feature in construction of the invention in a second aspect resides in a tilt device secured onto a work table of a machine tool wherein a spindle head rotatably supporting a tool spindle and the work table to which a workpiece is detachably attached are relatively moved to machine the workpiece with a tool attached to the tool spindle, the tilt device being characterized by comprising a support pedestal secured on the work table; a drive spindle having a large diameter portion, an intermediate diameter portion and a small diameter portion formed in turn and supported at the large diameter portion and the small diameter portion by a front bearing and a rear bearing in the support pedestal to be rotatable about a pivot axis; a distributor provided on the axis of the drive spindle for distribution of pressurized oil; a direct drive motor provided with a stator fixedly fitted in a retention bore which is formed coaxially of the pivot axis between the front bearing and the rear bearing in the support pedestal, and a rotor fitted on the intermediate diameter portion of the drive spindle; an annular member fitted on the intermediate diameter portion of the drive spindle to be prevented by a key from rotation and secured to a front end surface of the rotor; fixing means inserted in an axial direction from a front end surface of the drive spindle through the large diameter portion between the distributor and the front bearing and pressing the annular member against a stepped portion between the large diameter portion and the intermediate diameter portion; a tilt table secured to the drive spindle; and a controller for controlling the relative angular position between the tool and the workpiece by rotating the drive spindle by the operation of the direct drive motor and for rotating the tilt table at a high speed to shake out chips by rotating the direct drive motor at a high speed with the spindle head and the work table kept away in a predetermined period of time in the course of machining the workpiece.

The feature in construction of the invention in a third aspect resides in that in the tile device described in the second aspect, the support pedestal is composed of a front support section secured to the work table and having formed a front bearing outer race bore and the retention bore fitting therein an outer race of the front bearing and the stator of the direct drive motor and a rear support section having formed a rear bearing outer race bore fitting therein an outer race of the rear bearing and secured to the front support section; that the stator is pressed against a bottom stepped portion of the retention bore by fixing means which are inserted in an axial direction from a front end surface of the front support section around the outer diameter of the outer race of the front bearing, and a front end surface of a fitting portion which is protruded from the rear support section to fit in the retention bore is pressed against a rear end surface of the stator by fixing means which are inserted in the axial direction from a rear end surface of the rear support section, whereby the rear support section is secured to the front support section; and that between a rear end surface of the front support section and a shoulder surface radially extending from a base end of the fitting portion of the rear support section, a spacer is interposed fluid-tightly in contact with the rear end surface of the front support section and the shoulder surface of the rear support section.

The feature in construction of the invention in a fourth aspect resides in that in the tile device described in the third aspect, the distributor is provided with a stationary-side member secured to a cap member secured to the rear end surface of the rear support section and extending on the axis of the drive spindle and a rotary-side member secured to the front end surface of the drive spindle to extend on the axis of the drive spindle and fitted at a distribution hole on the stationary-side member; that a plurality of stationary fluid passages connected externally are holed in the stationary-side member; and that a plurality of rotary fluid passages which respectively communicate with the plurality of stationary fluid passages in the distribution hole open on a front end surface of the rotary-side member which is formed to be a flat surface even with the front end surface of the drive spindle.

The feature in construction of the invention in a fifth aspect resides in that in the tile device described in the third or fourth aspect, the tile device comprises a clamping ring secured to the rear end surface of the rear support section on the pivot axis; an annular plate coaxially secured to a rear end of the drive spindle to be restricted from relative rotation but to be relatively movable in the direction of the pivot axis; a cylinder device for press- contacting or releasing the annular plate with the clamping ring; a compression spring urging a piston of the cylinder device to bring the annular plate into press contact with the clamping ring; and retraction means for retracting the piston against the resilient force of the compression spring.

The feature in construction of the invention in a sixth aspect resides in that in the tile device described in any one of the first to fifth aspects, the predetermined period of time is set within a tool change period of time during which the machine tool changes a tool attached to the tool spindle by a tool changer.

Effects of the Invention

In the invention in the first aspect constructed as described above, the relative angular position between the tool and the workpiece is controlled by rotating the drive spindle by the direct drive motor, and the tilt table is rotated at the high speed to shake out chips by rotating the direct drive motor at the high speed with the spindle head and the work table kept away in the predetermined period of time in the state that the workpiece is attached on the tilt table. Thus, it is possible to shake chips generated by machining a workpiece with a tool, from the workpiece and the tile table and hence, to enhance the machining accuracy, and it is possible to unload the workpiece from the tilt device after machining in the state that chips are not adhered to the workpiece and hence, to reduce the time and labor taken for chip removal. Further, since the drive spindle is driven by the direct drive motor, there are not plays in comparison with one which rotationally drives a drive spindle through a worm and a worm wheel, so that the rotational positioning accuracy of the tile table is enhanced and that the tilt table can be smoothly rotated at a high speed.

In the invention in the second aspect constructed as described above, the drive spindle having the large diameter portion, the intermediate diameter portion and the small diameter portion formed in turn is supported at the large diameter portion and the small diameter portion by the front bearing and the rear bearing in the support pedestal to be rotatable about the pivot axis. The distributor for distribution of pressurized oil is provided on the axis of the drive spindle. The stator of the direct drive motor is fixedly fitted in the retention bore which is formed coaxially between the front bearing and the rear bearing in the support pedestal, and the rotor is fitted on the intermediate diameter portion of the drive spindle. The annular member fitted on the intermediate diameter portion of the drive spindle to be prevented by the key from rotation is secured to the front end surface of the rotor. The annular member is pressed against the stepped portion between the large diameter portion and the intermediate diameter portion of the drive shaft by the fixing means which are inserted in the axial direction from the front end surface of the drive spindle through the large diameter portion between the distributor and the front bearing. The tilt table is secured to the drive spindle.

Thus, in addition to the effects attained by the invention in the first aspect, downsizing can be attained by making the dimension at an upper end portion of the support pedestal which supports the drive spindle provided with the distributor on the axis, slightly larger than the outer diameter of the direct drive motor which rotationally drives the drive spindle, and it is possible to machine the workpiece which is secured to the tilt table by a jig operated by the pressurized oil supplied and discharged through the distributor, within a wide machining area without the occurrence of an interference between the tool and the tilt device.

In the invention in the third aspect constructed as described above, the support pedestal is constituted in such a manner that the front support section which has formed the front bearing outer race bore and the retention bore fitting therein the outer race of the front bearing and the stator of the direct drive motor is secured to the base and that the rear support section which has formed the rear bearing outer race bore fitting therein the outer race of the rear bearing is secured to the front support section. The stator is pressed against the bottom stepped portion of the retention bore by the fixing means which are inserted in the axial direction from the front end surface of the front support section around the outer diameter of the outer race of the front bearing. The front end surface of the fitting portion which is protruded from the rear support section is pressed against the rear end surface of the stator by the fixing means which are inserted in the axial direction from the rear end surface of the rear support section, whereby the rear support section is secured to the front support section. The spacer which contacts the rear end surface of the front support section and the shoulder surface of the rear support section is fluid-tightly interposed between the rear end surface of the front support section and the shoulder surface radially extending from the base end of the fitting portion of the rear support section.

Thus, it is possible to unit the front support section, the stator and the rear support section fluid-tightly and rigidly in a small space in radial direction, and it is possible to support the drive spindle precisely by the front bearing and the rear bearing.

In the invention in the fourth aspect constructed as described above, the stationary-side member of the distributor is secured to the cap member secured to the rear end surface of the rear support section and extends on the axis of the drive spindle, and the rotary-side member of the distributor is secured to the front end surface of the drive spindle to extend on the axis of the drive spindle and is fitted at the distribution hole on the stationary-side member. The plurality of stationary fluid passages connected externally are holed in the stationary-side member, and the plurality of rotary fluid passages which respectively communicate with the plurality of stationary fluid passages in the distribution hole open on the front end surface of the rotary-side member which is formed to be the flat surface even with the front end surface of the drive spindle. Thus, for example, it is possible to provide a piping to the jig attached to the tilt table, easily and compactly.

In the invention in the fifth aspect constructed as described above, the clamping ring is secured to the rear end surface of the rear support section on the pivot axis, and the annular plate which is coaxially secured to the rear end of the drive spindle to be restricted from relative rotation but to be relatively movable in the direction of the pivot axis is pressed or released by the cylinder device with the clamping ring, so that the rotation of the drive spindle and hence, the tilt table is restricted or enabled. At the time of the cylinder device being out of operation, the piston is urged by the resilient force of the compression spring to press the annular plate against the clamping ring, and thus, even in the state that the operation of the tilt device is stopped, the rotation of the drive spindle is restricted, so that the tilt table can be prevented from being rotated suddenly. Further, since it is possible to retract the piston against the resilient force of the compression spring, it is possible to easily perform, e.g., the attaching/detaching of the tilt table and the maintenance and the like of the peripheries of the drive spindle by rotating the drive spindle even in the state that the operation of the tilt device is stopped.

In the invention in the sixth aspect constructed as described above, in the predetermined period of time which is set within the tool change period of time during which the machine tool changes a tool attached to the tool spindle by the tool changer, the drive spindle and hence, the tilt table are rotated at the high speed by rotating the direct drive motor at the high speed in the state that the spindle head and the work table are kept away. Thus, without elongating the cycle time, it is possible to shake chips and coolant from the workpiece and the tilt table within the time period for automatically changing the tool. Accordingly, particularly, where a workpiece W is machined by the use of many tools, it does not take place that chips and coolant are accumulated on the workpiece W and the like, and when all of machining is completed, it is sufficient to shake out the chips generated during the machining with the last tool T and coolant, so that it becomes possible to easily take out the workpiece W in the state that the same does not have chips and coolant adhered thereto.

FORM FOR PRACTICING THE INVENTION

Figure 1:
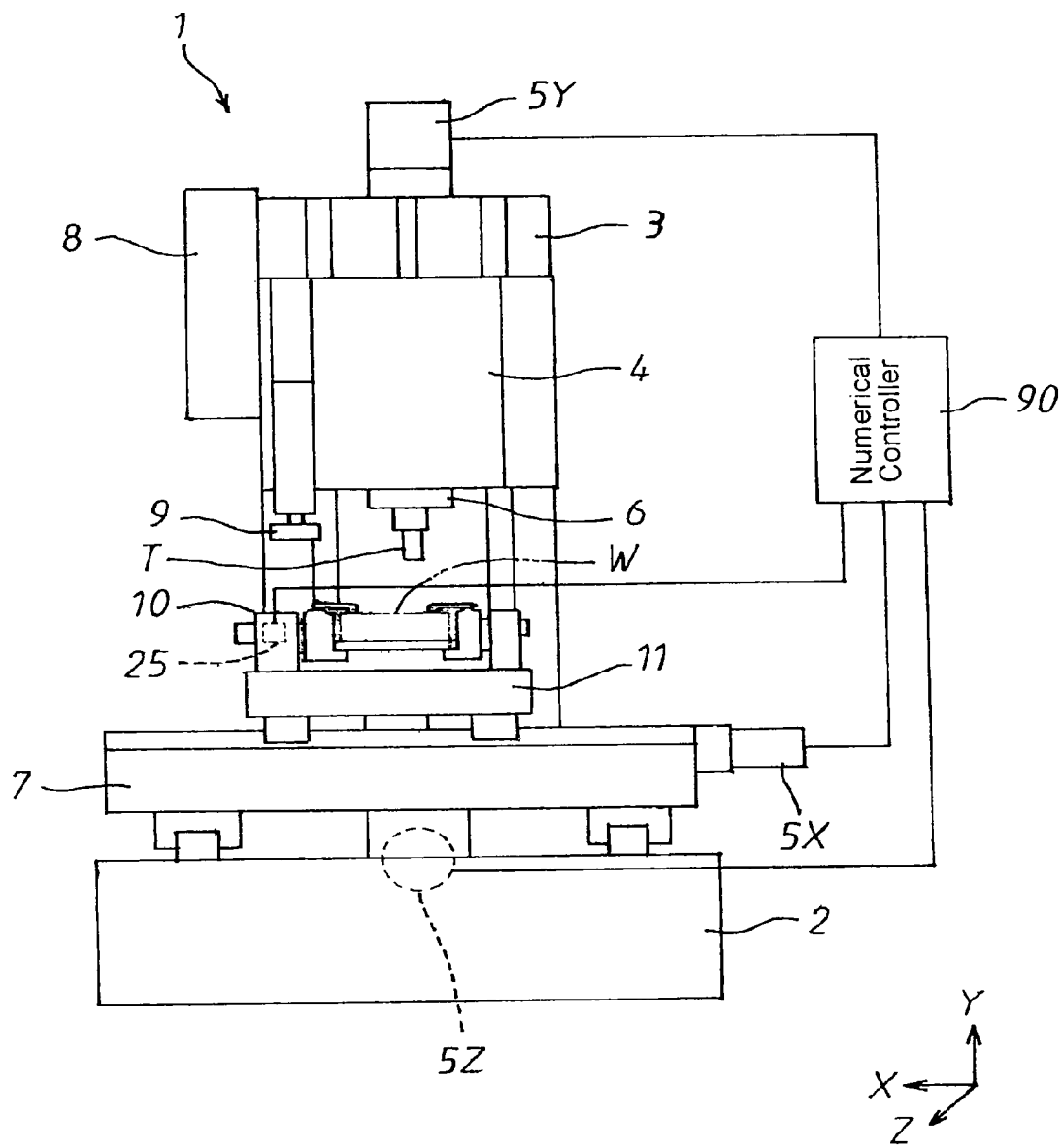
FIG. 1 is a view showing a machining center equipped with a tilt device in an embodiment.

Hereafter, a tilt device in an embodiment of the present invention will be described with reference to the drawings. As shown in FIG. 1, the tilt device 10 is fixed on a work table 11 of a machine tool such as a vertical machining center 1 or the like. In the machining center 1, a column 3 is provided upright on a bed 2, and a spindle head 4 is mounted on the column 3 to be movable in a vertical direction and is moved by a ball screw rotationally driven by a servomotor 5Y. A tool spindle 6 is supported in the spindle head 4 to be rotatable about a vertical axis and is rotationally driven by a built-in motor (not shown). The tool spindle 6 is provided with a tool attaching device which detachably holds a tool T inserted into a tool attaching hole formed at a lower end of the tool spindle 6. On the bed 2, a saddle 7 is mounted to be movable in a horizontal forward-rearward direction and is moved in a Z-axis direction by a ball screw which is rotationally driven by a servomotor 5Z. On the saddle 7, the work table 11 is mounted to be movable in a horizontal left-right direction and is moved in an X-axis direction by a ball screw which is rotationally driven by a servomotor 5X. The column 3 is provided thereon with a tool magazine 8 for storing a plurality of tools T and for indexing a tool T to be used next to a tool change position and an tool changer 9 for changing the next tool indexed to the tool change position with a used tool T which remains attached in the tool spindle 6 upon completion of a machining.

Figure 2:
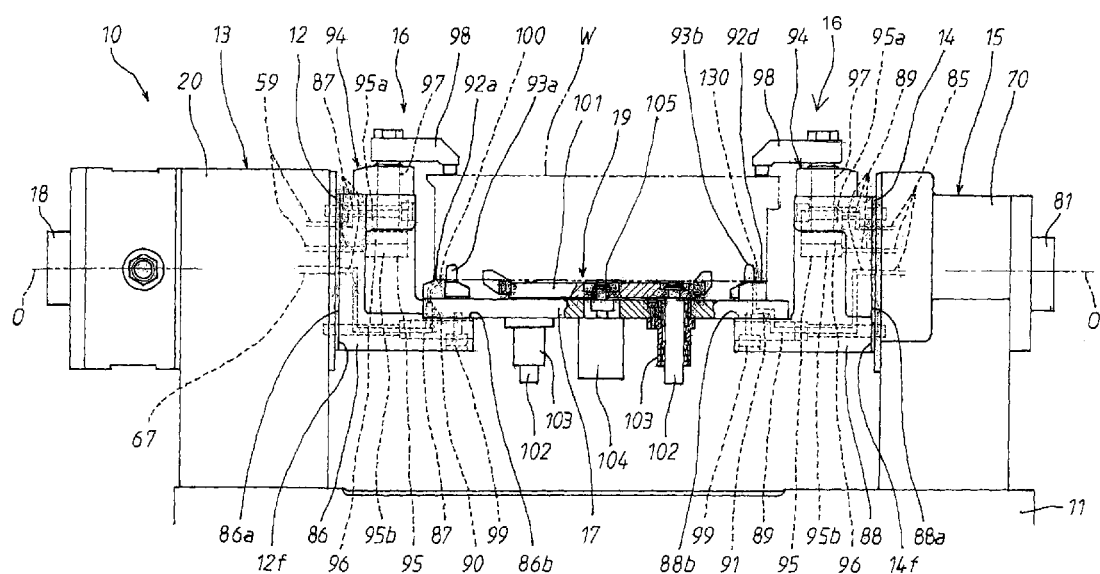
FIG. 2 is a view showing the outline of the tilt device in the embodiment.

As shown in FIG. 2, the tilt device 10 is provided with a drive device 13 secured to the work table 11 for rotationally driving a drive spindle 12 about a pivot axis O, a follower device 15 secured to the work table 11 in face-to-face relation with the drive device 13 and supporting a follower spindle 14 rotatably about the pivot axis O, a tilt table 17 secured at opposite ends thereof respectively to an extreme end of the drive spindle 12 and an extreme end of the follower spindle 14 and attaching to an upper surface thereof jigs 16 which hold a workpiece W, and a lift device 19 for lowering a workpiece W, loaded by a loading/unloading device (not shown), in a temporal supporting state to position the workpiece W by fitting reference holes provided on the workpiece W on reference pins provided on the jigs. Distributors 18, 81 for fluid distribution which supply and discharge fluid with respect to the jigs 16 and the like are provided on the axes of the drive spindle 12 and the follower spindle 14.

Figure 3:
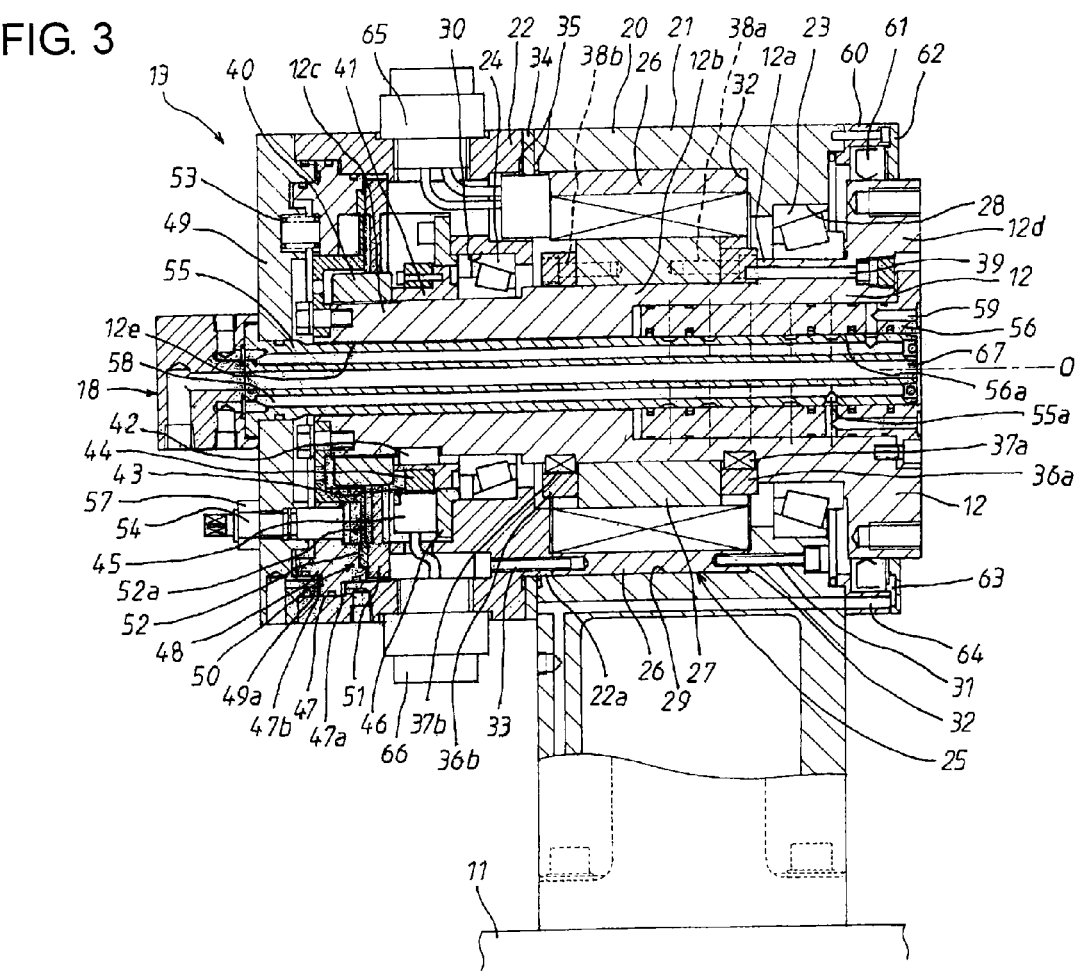
FIG. 3 is a longitudinal sectional view of a drive device in the tilt device.

As shown in FIG. 3, the drive device 13 has a first support pedestal 20 rotatably supporting the drive spindle 12 through a front bearing 23 and a rear bearing 24 and secured to the work table 11. The first support pedestal 20 is composed of a front support section 21 which is provided at an upper part thereof with a cylindrical portion rotatably supporting the drive spindle 12 and which is provided at a lower part thereof with a leg portion secured to the work table 11, and a cylindrical rear support section 22 which rotatably supports a rear end portion of the drive spindle 12 and which is secured to a cylindrical portion of the front support section 21.

In the front support section 21, there are formed a front bearing outer race bore 28 and a retention bore 29 which fit therein an outer race of the front bearing 23 and a stator 26 of a direct drive motor 25. In the rear support section 22, there is formed a rear bearing outer race bore 30 which fits therein an outer race of the rear bearing 24. The stator 26 is fitted in the retention bore 29, and a plurality of bolts 31 (fixing means) which are inserted in the axial direction from a front end surface of the front support section 21 around the outside of the outer race of the front bearing 23 are screw-fixed into a front end surface of the stator 26, whereby that the stator 26 is pressed against a bottom step portion 32 of the retention bore 29. In the rear support section 22, bolts 33 (fixing means) inserted from a rear end surface of the rear support section 22 in the axial direction are screw-fixed into a rear end surface of the stator 26, and thus, a front end surface of a fitting portion 22a which protrudes from the rear support section 22 to be fitted in the retention bore 29 is pressed against the rear end surface of the stator 26, whereby the rear support section 22 is secured to the front support section 21. Between the rear end surface of the front support section 21 and a shoulder surface which radially extends from a base end of the fitting portion 22a of the rear support section 22, a spacer 34 whose thickness is adjusted on the basis of an on-site adjustment is interposed to be in contact with the rear end surface of the front support section 21 as well as with the shoulder surface of the rear support section 22. Seal members 35 are interposed between opposite end surfaces of the spacer 34 and the rear end surface of the front support section 21 and the shoulder surface of the rear support section 22 to fluid-tightly isolate the interior from the exterior. Thus, the front support section 21, the stator 26 of the direct drive motor 25 and the rear support section 22 are united fluid-tightly and rigidly with the space reduced in radial directions, and the stator 26 is fixedly fitted in the retention bore 29 which is formed in the first support pedestal 20 between the front bearing 23 and the rear bearing 24 coaxially of the pivot axis O. A socket 65 for wiring to the direct drive motor 25 is fluid-tightly attached to the rear support section 22.

The drive spindle 12 has a large diameter portion 12a, an intermediate portion 12b and a small diameter portion 12c formed in turn thereon, and the drive spindle 12 is supported in the first support pedestal 20 to be precisely rotatable about the pivot axis O with the large diameter portion 12a fitted in an inner race of the front bearing 23 and with the small diameter portion 12c fitted in an inner race of the rear bearing 24. The rotor 27 of the direct drive motor 25 and annular members 36a, 36b are fitted on the intermediate diameter portion 12b of the drive spindle 12. The annular member 36a is prevented with a key 37a from rotation relative to the intermediate diameter portion 12b and is secured by means of bolts 38a to a front end surface of the rotor 27. The annular member 36b is prevented with a key 37b from rotation relative to the intermediate diameter portion 12b and is secured by means of bolts 38b to a rear end surface of the rotor 27. The annular member 36a is pressed against a step portion between the large diameter portion 12a and the intermediate portion 12b by being screw-fixed by means of bolts 39 (fixing means) which are inserted from the front end surface of the drive spindle 12 through the large diameter portion 12a between the distributor 18 and the front bearing 23.

The front end of the drive spindle 12 has a flange 12d formed at a forward part of the large diameter portion 12a, and an oil seal 61 is interposed between a large diameter portion internal surface of a stepped bore of an attaching member 60 secured to the front end surface of the front support section 21 and an external surface of the flange 12d and is held by an annular retention member 62 secured to a front end of the attaching member 60, in the large diameter portion of the stepped bore of the attaching member 60. The retention member 62 is formed with a labyrinth at a small diameter portion internal surface of the stepped bore formed on the internal surface of the retention member 62 and is fitted on the flange 12d with a slight clearance. The large diameter portion of the stepped bore formed in the retention member 62 defines an annular air purge chamber 63 between a rear surface side of the retention member 62 and the front surface side of the oil seal 61. An air passage 64 connected to a compressed air supply for the factory is holed in the front support section 21, and the air passage 64 opens to the air purge chamber 63. Accordingly, the compressed air flown into the air purge chamber 63 through the air passage 64 is flown outside through the labyrinth at the small diameter portion internal surface of the stepped bore in the retention member 62, so that it is possible to prevent cutting lubricant or the like from entering the inside of the drive device 13.

A nut 40 is screw-fixed on a rear end portion of the small diameter portion 12c of the drive spindle 12 and is pressed against the inner race of the rear bearing 24 through a ring member 41 to adjust a preload exerted on the front bearing 23 and the rear bearing 24. The ring member 41 is fitted on the small diameter portion 12c and is prevented with a key 42 from rotation with a magnet 44 of a rotational angle sensor 43 secured to an outer circumference thereof. A detection section 45 of the rotational angle sensor 43 is secured to an opening end surface of the rear bearing outer race bore 30 of the rear support section 22 through an annular member 46 and faces the magnet 44. A socket 66 for wiring to the rotational angle sensor 43 is fluid-tightly attached to the rear support section 22.

A stepped cylinder bore 47 is formed at a rear end portion of the rear support section 22 on the pivot axis O, and a front small diameter portion and a large diameter portion of a stepped piston 48 are respectively fitted on a small diameter portion and a large diameter portion of the stepped cylinder bore 47. A cap member 49 is secured to the rear end surface of the rear support section 22, and an external surface and an internal surface of an annular protruding portion 49a which annually protrudes from the front end surface of the cap member 49 are respectively fitted in the large diameter portion of the stepped cylinder bore 47 and a rear small diameter portion of the stepped piston 48. Then, a clamping ring 51 of a clamping device 50 is secured at a bottom surface of the small diameter bore of the stepped cylinder bore 47. An annular plate 52 is arranged between an end surface of the front small diameter portion of the stepped piston 48 and an end surface of the clamping ring 51, and the annular plate 52 is secured at a flange portion thereof to the rear end portion of the drive spindle 12 through a thin flexible portion 52a thereof. In this way, the annular plate 52 is coaxially secured to the rear end of the drive shaft 12 not to be relatively rotatable but to be relatively movable in the direction of the pivot axis.

The stepped cylinder bore 47 is partitioned by the large diameter portion of the stepped piston 48 into front and rear cylinder chambers 47a, 47b, which are connected to a pressurized oil source through a change-over valve (not shown). The supply of pressurized oil to the front cylinder chamber 47a causes the stepped piston 48 to be retracted, whereby the annular plate 52 is released from the clamping ring 51 to make the drive spindle 12 rotatable. The supply of pressurized oil to the rear cylinder chamber 47b causes the stepped piston 48 to be advanced, whereby the annular plate 52 is pressed against the clamping ring 51 to restrict the rotation of the drive spindle 12 with the oil pressure.

A plurality of compression springs 53 are interposed between an inside end surface of the cap member 49 and a rear end surface of the stepped piston 48, and the stepped piston 48 is urged forward by means of resilient forces of the compression springs 53. Thus, even in the state that the operation of the tilt device 10 is stopped, the annular plate 52 is pressed against the clamping ring 51 by means of the resilient forces of the compression springs 53 to restrict the rotation of the drive spindle 12.

Two screw shafts 54 extending in the direction of the pivot axis O are engaged with the stepped piston 48, and a nut 57 is screw-engaged with each screw shaft 54 outside of the cap member 49. When the clamping device 50 is to be released manually, the screw shafts 54 and hence, the stepped piston 48 are retracted against the resilient forces of the compression springs 53 by rotating the nuts 57 in the state that the same are in contact with an outside end surface of the cap member 49, and this causes the annular plate 52 to be released from the clamping ring 51, whereby the drive spindle 12 becomes rotatable. The screw shafts 54 engaged with the stepped piston 48, the nuts 57 and the like constitute retraction means for retracting the stepped piston 48 against the resilient forces of the compression springs 53.

A stationary-side member 55 of the distributor 18 is secured to the cap member 49 on the pivot axis O and passes through a small diameter portion of an axis hole 12e of the drive spindle 12 to extend to the vicinity of the front end of the drive spindle 12. A rotary-side member 56 of the distributor 18 is secured to the front end surface of the drive spindle 12 to extend rearward on the axis, is fitted in a large diameter portion of the axis hole 12e of the drive spindle 12 and is fitted at a distribution hole 56a thereof on the external surface of the stationary-side member 55. Six stationary fluid passages 58 for example are holed at a circumferentially equiangular interval to extend in the direction of the pivot axis O, six annular grooves 55a are formed on the external surface of the stationary-side member 55 at axially different positions in the distribution hole 56a, and respective stationary fluid passages 58 are bent to communicate with the respective annular grooves 55a. In the rotary-side member 56, six rotary fluid passages 59 are holed at a circumferentially equiangular interval to extend in the direction of the pivot axis O, and rear ends of the respective rotary fluid passages 59 are in communication with the respective stationary fluid passages 58 by being bent to open in the distribution hole 56a in face to face relation with the respective annular grooves 55a. Front ends of the respective rotary fluid passages 59 open on a front end surface of the rotary-side member 56 which is formed to be a flat surface even with the front end surface of the drive spindle 12.

As shown in FIG. 2, since an angle rest 86 of an L-letter shape is secured to the front end of the drive spindle 12 with its attaching surface 86a being in contact with the front end surface 12f of the drive spindle 12, angle rest fluid passages 87 which are holed in the angle rest 86 to open on the attaching surface 86a communicate with the rotary fluid passages 59 which open on the front end surface of the rotary-side member 56 of the distributor 18. Two angle rest fluid passages 87 are in communication with upper and lower chambers 95a, 95b of a cylinder device 94 which vertically moves a holding arm 98 of the jig 16 attached to the tilt table 17. Two stationary fluid passages 58 communicating with these two rotary fluid passages 59 are connected to the pressurized oil supply device or an oil tank through a change-over valve. Thus, a hydraulic circuit for supplying and discharging pressurized oil with respect to the cylinder device 94 which vertically moves the holding arm 98 can be constructed easily and to be compact.

Further, as shown in FIGS. 2 and 3, a cutting lubricant hole 67 connected to a cutting lubricant supply device through a shutoff valve passes on the axis of the stationary-side member 55 and opens at a front end opening portion of the stationary-side side member 55. Thus, with the angle rest 86 fixed to the front end of the drive spindle 12, one angle rest fluid passage 87 opens to the front end opening portion of the cutting lubricant hole 67 of the stationary-side member 55 and communicates with the cutting lubricant supply device. This one angle rest fluid passage 87 is connected to a cutting lubricant nozzle 100 which supplies cutting lubricant toward a reference surface 92a and the like in order to wash away chips adhered to such a reference surface of the jig 16. Further, the aforementioned one angle rest fluid passage 87 is connected to cutting lubricant nozzles which supply cutting lubricant toward portions of the jig 16 on which chips are liable to be accumulated or spaces or the like between a workpiece W and the jig 16 on which chips are liable to be accumulated, to wash away the chips.

Figure 4:
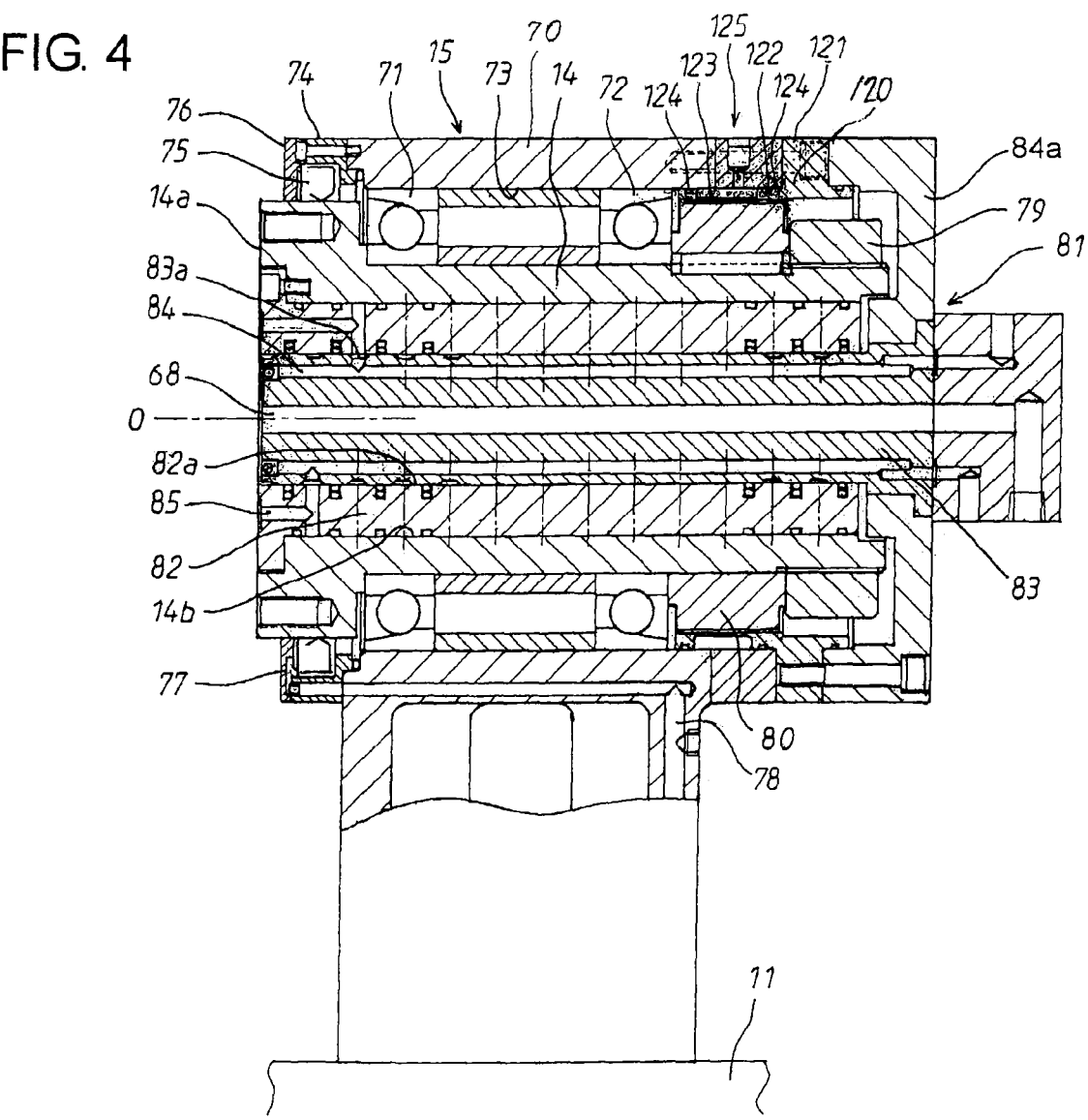
FIG. 4 is a longitudinal sectional view of a follower device.

As shown in FIG. 4, the follower device 15 has a second support pedestal 70 rotatably supporting the follower spindle 14 through a front bearing 71 and a rear bearing 72 and secured on the work table 11. In the second support pedestal 70, a cylindrical portion rotatably supporting the follower spindle 14 is formed at an upper part thereof, and a leg portion secured to the work table 11 is formed at a lower part thereof. At the upper part of the second support pedestal 70, a bearing bore 73 is formed to pass through the upper part on the pivot axis O, and outer races of the front bearing 71 and the rear bearing 72 are closely fitted in the bearing bore 73 to be movable in the axial direction.

Inner races of the front bearing 71 and the rear bearing 72 are fitted on the follower spindle 14, and the follower spindle 14 is supported in the second support pedestal 70 to be precisely rotatable about the pivot axis O. A flange 14a is formed at a front end of the follower spindle 14, and an oil seal 75 is interposed between a large diameter portion internal surface of a stepped bore of an attaching member 74 secured to a front end surface of the second support pedestal 70 and an external surface of the flange 14a and is retained in the large diameter portion of the stepped bore of the attaching member 74 by an annular retention member 76 secured to a front end of the attaching member 74. The retention member 76 has a labyrinth formed on a small diameter portion internal surface of a stepped bore formed at an internal surface thereof and is fitted on the flange 14a with a slight clearance therebetween. An annular air purge chamber 77 is formed at a large diameter portion of the stepped bore formed in the retention member 76 between a rear surface side of the retention member 76 and a front surface side of the oil seal 75. An air passage 78 connected to the compressed air supply of the factory is holed in the second support pedestal 70, and the air passage 78 opens to the air purge chamber 77. Accordingly, the compressed air flowing into the air purge chamber 77 through the air passage 78 flows outside through the labyrinth at the small diameter portion internal surface of the stepped bore of the retention member 76, so that cutting lubricant or the like can be prevented from entering the inside of the follower device 15.

A nut 79 is screw-fixed on a rear end portion of the follow spindle 14 and is pressed against the inner race of the rear bearing 72 through a ring member 80 which is fitted on the follower spindle 14 to be prevented by a key from rotation, so that a preload on the front bearing 71 and the rear bearing 72 can be adjusted.

A clamping member 120 is secured at its flange portion 121 to the rear end portion of the second support pedestal 70 by means of bolts, and a cap member 84a which fluid-tightly closes a rear end opening portion of the second support pedestal 70 is secured to a rear end surface of the flange portion 121 by means of bolts. A clamping portion 122 extending forward of the clamping member 120 is fitted in the bearing bore 73 of the second support pedestal 70 and is fitted on an external surface of the ring member 80 with a play of a slight clearance. An annular clamping oil chamber 123 is formed on an external surface of the clamping portion 122, and O-rings 124 are interposed between the external surface and the bearing bore 73 at opposite sides of the clamping oil chamber 123. When pressurized oil is supplied to the clamping oil chamber 123, a bottom portion of the clamping oil chamber 123 is flexed to be brought into press contact with the external surface of the ring member 80 to restrict the rotation of the follower spindle 14. The clamping portion 122 and the clamping oil chamber 123 of the clamping member 120, the ring member 80 and the like constitute a clamping device 125 for the follower spindle 14. The clamping device 125 restricts the rotation of the follower spindle 14 when pressurized oil is supplied to the clamping oil chamber 123, but releases the follower spindle 14 when the pressurized oil in the clamping oil chamber 123 is discharged.

A numeral 81 denotes the distributor on the follower device 15 side, and a cylindrical rotary-side member 82 of the distributor 81 is closely fitted in an axis hole 14b of the follower spindle 14 and is secured at a front end flange portion thereof to a front end surface of the follower spindle 14. A stationary-side member 83 of the distributor 81 is secured to the cap member 84a on the pivot axis O and extends to the vicinity of the front end of the follower spindle 14 with itself fitted in a distribution hole 82a of the rotary-side member 82. Twelve stationary fluid passages 84 are holed in the stationary-side member 83 at a circumferentially equiangular interval to extend in the direction of the pivot axis O, while twelve annular grooves 83a are formed on an external surface of the stationary-side member 83 at axially different positions in the distribution hole 82a, wherein the respective stationary fluid passages 84 are bent to communicate with the respective annular grooves 83a. Twelve rotary fluid passages 85, for example, are holed in the rotary-side member 82 at a circumferentially equiangular interval to extend in the direction of the pivot axis O, and rear ends of the respective rotary fluid passages 85 communicate with respective stationary fluid passages 84 by being bent to open in the distribution hole 82a in face to face relation with the respective annular grooves 83a. Front ends of the respective rotary fluid passages 85 open on a front end surface of the rotary-side member 82 which is formed to be flat even with the front end surface of the follower spindle 14.

As shown in FIGS. 2 and 4, since an angle rest 88 of an L-letter shape is secured to the front end of the follower spindle 14 with its attaching surface 88a being in contact with the front end surface 14f of the follower spindle 14, angle rest fluid passages 89 which are holed in the angle rest 88 to open on the attaching surface 88a communicate with the rotary fluid passages 85 which open on the front end surface of the rotary-side member 82 of the distributor 81. Two angle rest fluid passages 89 are in communication with upper and lower chambers 95a, 95b of another cylinder device 94 which vertically moves another holding arm 98 of the jig 16 attached to the tilt table 17. Two stationary fluid passages 84 communicating with these two rotary fluid passages 85 are connected to the pressurized oil supply device or the oil tank through the change-over valve.

Further, the compressed air supply and a pressure detection device are connected in parallel to one stationary fluid passage 84, and a rotary fluid passage 85 communicating with this one stationary fluid passage 84 is connected through communication with the angle rest fluid passage 89 to an air nozzle 130 opening on another reference surface 92d of the jig 16, so that there is constituted a seating detection device for detecting that the workpiece W is seated on the reference surface 92d. A cutting lubricant hole 68 connected to the cutting lubricant supply device through the shutoff valve is also formed to pass on the axis of the stationary-side member 83 and like the cutting lubricant hole 67 on the drive spindle side, supplies the reference surface with cutting lubricant to wash away chips adhered to the reference surface of the jig 16, so that cutting lubricant is supplied toward portions of the jig 16 on which chips are liable to be accumulated or spaces or the like between the workpiece W and the jig 16 on which chips are liable to be accumulated, to wash away the chips.

Support surfaces 86b, 88b parallel to the pivot axis O are formed on the angle rests 86, 88 to extend in a direction perpendicular to the pivot axis O, and the tilt table 17 taking the shape of a plate is secured by means of bolts 99 to the support surfaces 86b, 88b in contact with the same at a back surface thereof. Since the tile table 17 is secured with its back surface being in contact with the support surfaces 86b, 88b of the angle rests 86, 88, table fluid passages 90, 91 formed in the tilt table 17 communicate with the angle rest fluid passages 87, 89 formed in the angle rests 86, 88 through the contact of the back surface of the tilt table 17 with the support surfaces 86b, 88b. Thus, the angle rest fluid passages 87, 89 which are in communication with the cutting lubricant supply device through the cutting lubricant holes 67, 68 in the stationary-side members 55, 83 of the distributors 18, 81 are connected through the table fluid passages 90, 91 to the cutting lubricant nozzles 100 which supply cutting lubricant toward the reference surfaces 92a, 92d to wash away chips adhered to the reference surfaces 92a, 92d of the jigs 16. FIG. 2 shows the cutting lubricant nozzle 100 only which supplies cutting lubricant toward the reference surface 92a. Further, the angle rest fluid passages 87, 89 communicating with the cutting lubricant supply device are connected through the table fluid passages 90, 91 to the cutting lubricant nozzles (not shown) which supply cutting lubricant toward the portions of the jigs 16 on which chips are liable to be accumulated, or the spaces or the like between the workpiece W and the jigs 16 on which chips are liable to be accumulated, to wash away the chips. Furthermore, the angle rest fluid passages 87, 89 to which the compressed air supply and the pressure detection device are connected in parallel through the distributors 18, 81 are connected through the table fluid passages 90, 91 to the air nozzles 130 which open on the references surfaces 92a, 92d of the jigs 16 for detecting that the workpiece W is seated on the reference surfaces 92a, 92d. FIG. 2 shows the air nozzle 130 only which opens to the reference surfaces 92d.

On the tilt table 17, the lift device 19 is provided for temporarily supporting on a temporal support table 101 the workpiece W loaded by the loading/unloading device (not shown) and for vertically moving the workpiece W. A pair of guided rods 102 protruding downward are secured to a lower surface of the temporal support table 101 and are slidably fitted in guide members 103 secured to the tilt table 17. A cylinder device 104 is secured to the lower surface of the tilt table 17, and a piston rod 105 of the cylinder device 104 passes through the tilt table 17 to be secured to the temporal support table 101.

A numerical controller 90 relatively moves the spindle head 4 rotatably supporting the tool spindle 6 and the work table 11 with the workpiece W detachably attached thereto to machine the workpiece W with a tool T attached to the tool spindle 6 by rotationally controlling the servomotors 5X, 5Y and 5Z of the machining center 1, the direct drive motor 25 of the tilt device 10 and the like and controls the relative angular position between the tool T and the workpiece W by rotating the drive spindle 12 and hence, the tilt table 17. Further, the numerical controller 90 separates the spindle head 4 and the work table 11 for a predetermined period of time in the course of the machining of the workpiece W with the tool T by rotationally controlling the servomotors 5X, 5Y and 5Z of the machining center 1 and, by rotating the direct drive motor 25 of the tilt device 10 at a high speed, rotates the drive spindle 12 and the tilt table 17 at such a high speed as, e.g., 50 rpm or higher, preferably 200 rpm or so to shake out chips and coolant accumulated on the workpiece W, the tilt table 17 and the like.

Figure 5:
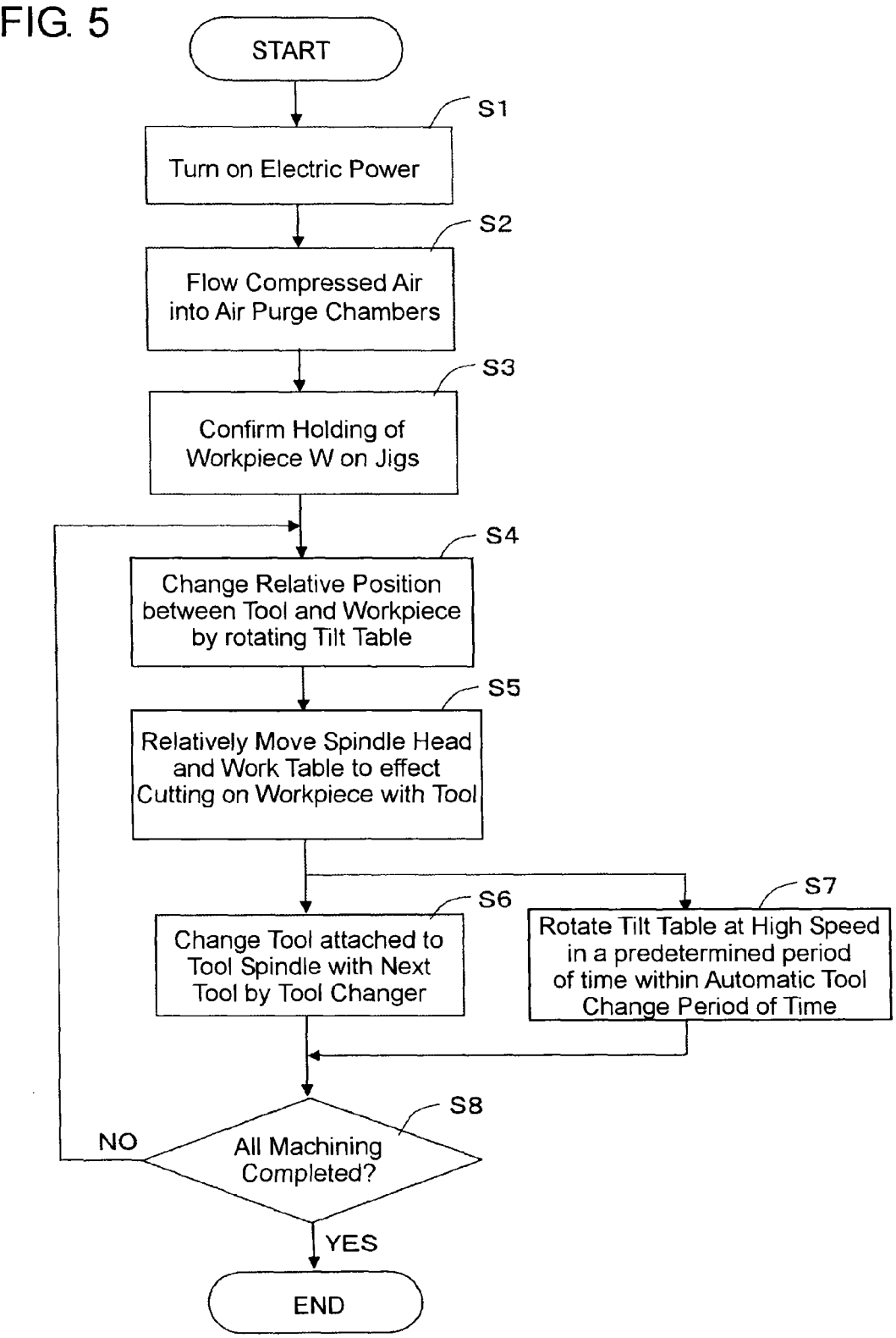
FIG. 5 is a flow chart showing a machining program.

Next, the operation of the foregoing embodiment will be described. The numerical controller 90 executes a machining program shown in FIG. 5 and machines the workpiece W with the tool T. When having an unfinished workpiece W mounted thereon by the loading/unloading device, the temporal support table 101 is moved downward by the cylinder device 104 and inserts the reference holes provided on the workpiece W on the reference pins 93a, 93b provided on the tilt table 17 to position the workpiece W in a workpiece mounting plane and to place the workpiece W on the reference surfaces 92a, 92d. At this time, cutting lubricant is flown out from the cutting lubricant nozzle 100 through the cutting lubricant hole 67, the angle rest fluid passage 87 and the table fluid passage 90 to wash away chips adhered to the reference surface 92a of the jig 16. Chips adhered to the reference surface 92d are washed away in the same manner.

When electric power is inputted (step S1), the shutoff valve is opened to make compressed air flow into the air purge chambers 63, 77 through the air passages 64, 78, and the compressed air flows outside through the labyrinths at the small diameter portion internal surfaces of the stepped bores of the retention members 62, 76, whereby the cutting lubricant and the like can be prevented from entering the insides of the drive device 13 and the follower device 15 (step S2). When the workpiece W is placed on the reference surfaces 92a, 92d, pressurized oil is supplied to upper chambers 95a of the respective cylinders 95 through the distributors 18, 81, and the respective holding arms 98 are moved downward by the respective cylinder devices 94 to press the upper surface of the workpiece W toward the reference surfaces 92a, 92d to fix the workpiece W on the jigs 16. The seating of the workpiece W on the reference surfaces is confirmed because it is detected by the pressure detection device that the air nozzles 130 opening on the reference surfaces 92a, 92d are closed by the bottom surface of the workpiece W with the back pressures rising (step S3).

After it is confirmed that the workpiece W is seated on the reference surfaces 92a, 92d and is held on the jigs 16, if the setting of the relative angular position between the tool T and the workpiece W is required to be changed, the clamping devices 50, 125 release the drive spindle 12 and the follower spindle 14, the drive spindle 12 is rotated by the direct drive motor 25 to rotate the tilt table 17 relative to the tool spindle 6, and thereafter, the clamping devices 50, 125 are operated to restrict the rotations of the drive spindle 12 and the follower spindle 14 (step S4). That is, the change-over valve is switched to supply pressurized oil to the front cylinder chamber 47a, while the rear cylinder chamber 47b is brought into communication with the tank. Thus, the stepped piston 48 is retracted against the resilient forces of the compression springs 53, and the annular plate 52 is separated from the clamping ring 51 to release the clamping device 50, whereby the drive spindle 12 becomes rotatable. At the same time, pressurized oil is discharged from the clamping oil chamber 123, and the bottom portion of the clamping oil chamber 123 is retracted from the external surface of the ring member 80 to make the follower spindle 14 rotatable. Thereafter, the direct drive motor 25 is driven to rotate the rotor 27, and the drive spindle 12 is rotated through the annular members 36a, 36b secured to the front and rear end surfaces of the rotor 27 and the keys 37a, 37b. When the rotational angle of the drive spindle 12, namely that the tilt table 17 has been rotated to a desired angular position is detected by the rotational angle sensor 43, the direct drive motor 25 is stopped, and the change-over valve is switched to supply the rear cylinder chamber 47b with pressurized oil and to make the front cylinder chamber 47a communicate with the tank. As a result, the stepped piston 48 is advanced, and the clamping device 50 is brought into operation with the annular plate 52 pressed against the clamping ring 51 to restrict the rotation of the drive spindle 12 by a pressurized oil force. At the same time, the clamping oil chamber 123 is supplied with pressurized oil, and the bottom portion of the clamping oil chamber 123 is flexed and pressed against the external surface of the ring member 80 to restrict the rotation of the follower spindle 14. Therefore, it does not occur that the tilt table 17 is rotationally moved due to a cutting force.

Then, the servomotors 5X, 5Y and 5Z are rotationally controlled to move the work table 11, the spindle head 4 and the saddle 7, and thus, the tool spindle 6 being rotationally driven and the work table 11 are moved relatively, whereby the workpiece W is machined with the tool T attached to the tool spindle 6 (step S5). While the workpiece W is being machined with the tool T, cutting lubricant is supplied from the cutting lubricant nozzles toward the portions of the jigs 16 on which chips are liable to be accumulated, or the spaces or the like between the workpiece W and the jigs 16 on which chips are liable to be accumulated, to wash away the chips.

Upon completion of the machining with the first tool T, in order to perform a tool change, the servomotors 5X, 5Y and 5Z are rotationally controlled to position the spindle head 4 and the tool spindle 6 to a tool change position, and the work table 11 and the saddle 7 are moved to move the work table 11 away from the spindle head 4. The tool magazine 8 is rotationally indexed so that a next tool T to be used next is presented to the tool change position. The tool changer 9 grips the tool T attached to the tool spindle 6 having been positioned to the tool change position and the next tool presented by the tool magazine 8 to the tool change position, and pulls the both tools T out of the tool spindle 6 and the tool magazine 8, and after a turn through an angle of 180 degrees, goes back to attach the next tool T to the tool spindle 6 and to return the used tool T to the tool magazine 8 (step S6).

Within a tool change time while the tool T attached to the tool spindle 6 is changed by the tool changer 9 and in the state that the spindle head 4 and the work table 11 are kept away, the direct drive motor 25 is rotated at a high speed only in a predetermined period of time to rotate the drive spindle 12 and hence, the tilt table 17 at a high speed (step S7). Therefore, without elongating the cycle time and within the time period for automatic change for the tools T, it is possible to shake out chips and coolant which would cause an adverse affect on the machining with the next tool, from on the workpiece W and the tilt table 17.

Upon the attachment of the next tool T to the tool spindle 6, the steps S2-S5 are repeated, so that the same operations are thereafter repeated until the machining with all of tools T necessary for the machining of the workpiece W is completed (step S8). Accordingly, in particular, where a workpiece W is machined by the use of many tools T, it does not take place that chips and coolant are accumulated on the workpiece W and the like, and when all of machining is completed, it is sufficient to shake out the chips generated during the machining with the last tool T and coolant, so that it becomes possible to easily take out the workpiece W in the state that the same does not have chips and coolant adhered thereto. Accordingly, it is possible to maintain clean a conveyor for transferring workpieces W between machining centers, and further, it can be prevented that the accurate positioning of a workpiece having been loaded to a machining center at a next step is obstructed by the intervention of chips between references surfaces and the workpiece W.

Generally, since in vertical machining centers, chips and coolant are liable to be accumulated on a workpiece, it may usually be the case that horizontal machining centers are chosen at sacrifices of a cost aspect and a space aspect. According to the present tilt device 10, since it does not occur that chips and coolant are accumulated on the workpiece W, it can be realized to choose and arrange right vertical machining centers in right places.

In the drive device 13 according to the present embodiment, for example, if the power supply is turned off after completion of works, the stepped piston 48 is advanced by the resilient forces of the compression springs 53, and the annular plate 52 is pressed against the clamping ring 51 to restrict the rotation of the drive spindle 12. Therefore, it does not occur that the tilt table 17 is turned suddenly due to a weight imbalance.

Further, because it is possible to retract the screw shafts 54 and hence, the stepped piston 48 against the resilient forces of the compression springs 53 by rotating the nuts 57 in contact with the outside end surface of the cap member 49, it is possible to easily rotate the drive spindle 12 even in the state that the tilt device 10 is out of operation, and it is possible for example to easily perform the attaching/detaching of the tilt table 17 or the maintenance and the like of the peripheries of the drive spindle 12.

In the foregoing embodiment, within the tool change period of time during which a tool T attached to the tool spindle 6 is changed by the tool changer 9 with a next tool, the tilt table 17 is rotated by the direct drive motor 25 only in a predetermined period of time with the spindle head 4 and the work table 11 kept away. However, for example, where the machining with one tool takes a long time, the spindle head 4 and the work table 11 may be spaced away only for a predetermined period of time in the course of such machining, and the tilt table 17 may be rotated by the direct drive motor 25 at a high speed.

Although in the foregoing embodiment, the tilt device is constituted by arranging the drive device 13 and the follower device 15 in face to face relation, the tilt device may be constituted by arranging two drive devices in face to face relation, wherein direct drive motors may be operated synchronously. Further, the tilt device may be constituted by one drive device 13 only.

INDUSTRIAL APPLICABILITY

A tilt device according to the present invention is suitable to be used as a tilt device which is equipped on a machine tool and which controls the relative angular position between a tool and a workpiece by rotating a tilt table by a direct drive motor.

DESCRIPTION OF REFERENCE SYMBOLS

1 . . . machining center, 2 . . . bed, 3 . . . column, 4 . . . spindle head, 5X, 5Y, 5Z . . . servomotors, 6 . . . tool spindle, 7 . . . saddle, 8 . . . tool magazine, 9 . . . tool changer, 10 . . . tilt device, 11 . . . work table, 12 . . . drive spindle, 13 . . . drive device, 14 . . . follower spindle, 15 . . . follower device, 16 . . . jigs, 17 . . . tilt table, 18 . . . distributor, 20 . . . first support pedestal, 21 . . . front support section, 22 . . . rear support section, 23 . . . front bearing, 24 . . . rear bearing, 25 . . . direct drive motor, 26 . . . stator, 27 . . . rotor, 28 . . . front bearing outer race bore, 29 . . . retention bore, 30 . . . rear bearing outer race bore, 31, 33, 38, 39 . . . bolts, 34 . . . spacer, 43 . . . rotational angle sensor, 49 . . . cap member, 50, 125 . . . clamping devices, 55 . . . stationary-side member, 56 . . . rotary-side member, 70 . . . second support pedestal, 71 . . . front bearing, 72 . . . rear bearing.

The invention claimed is:

1. A tilt device secured onto a work table of a machine tool wherein a spindle head rotatably supporting a tool spindle and the work table to which a workpiece is detachably attached are relatively moved to machine the workpiece with a tool attached to the tool spindle, the tilt device comprising:
a support pedestal secured on the work table;
a drive spindle having a large diameter portion, an intermediate diameter portion and a small diameter portion formed in turn and supported at the large diameter portion and the small diameter portion by a front bearing and a rear bearing in the support pedestal to be rotatable about a pivot axis;
a distributor provided on the axis of the drive spindle for distribution of pressurized oil;
a direct drive motor provided with a stator fixedly fitted in a retention bore which is formed coaxially of the pivot axis between the front bearing and the rear bearing in the support pedestal, and a rotor fitted on the intermediate diameter portion of the drive spindle;
an annular member fitted on the intermediate diameter portion of the drive spindle to be prevented by a key from rotation and secured to a front end surface of the rotor;
fixing means inserted in an axial direction from a front end surface of the drive spindle through the large diameter portion between the distributor and the front bearing and pressing the annular member against a stepped portion between the large diameter portion and the intermediate diameter portion;
a tilt table secured to the drive spindle; and
a controller for controlling a relative angular position between the tool and the workpiece by rotating the drive spindle by an operation of the direct drive motor and for rotating the tilt table at a high speed to shake out chips by rotating the direct drive motor at a high speed with the spindle head and the work table kept away within a predetermined period of time in the course of machining the workpiece, wherein the predetermined period of time is set within a tool change period of time during which the machine tool changes the tool attached to the tool spindle by a tool changer.

2. The tile device described in claim 1, wherein:
the support pedestal is composed of a front support section secured to the work table and having formed a front bearing outer race bore and the retention bore fitting therein an outer race of the front bearing and the stator of the direct drive motor and a rear support section having formed a rear bearing outer race bore fitting therein an outer race of the rear bearing and secured to the front support section;
the stator is pressed against a bottom stepped portion of the retention bore by fixing means which are inserted in an axial direction from the front end surface of the front support section around the outer diameter of the outer race of the front bearing, and a front end surface of a fitting portion which is protruded from the rear support section to fit in the retention bore is pressed against a rear end surface of the stator by fixing means which are inserted in the axial direction from a rear end surface of the rear support section, whereby the rear support section is secured to the front support section; and
between a rear end surface of the front support section and a shoulder surface radially extending from a base end of the fitting portion of the rear support section, a spacer is interposed fluid-tightly in contact with the rear end surface of the front support section and the shoulder surface of the rear support section.

3. The tile device described in claim 2, wherein:
the distributor is provided with a stationary-side member secured to a cap member secured to the rear end surface of the rear support section and extending on the axis of the drive spindle and a rotary-side member secured to the front end surface of the drive spindle to extend on the axis of the drive spindle and fitted at a distribution hole on the stationary-side member;
a plurality of stationary fluid passages connected externally are holed in the stationary-side member; and
a plurality of rotary fluid passages which respectively communicate with the plurality of stationary fluid passages in the distribution hole open on a front end surface of the rotary- side member which is formed to be a flat surface even with the front end surface of the drive spindle.

4. The tile device described in claim 2, further comprising:
a clamping ring secured to the rear end surface of the rear support section on the pivot axis;
an annular plate coaxially secured to a rear end of the drive spindle to be restricted from relative rotation but to be relatively movable in the direction of the pivot axis;
a cylinder device for press-contacting or releasing the annular plate with the clamping ring;
a compression spring urging a piston of the cylinder device to bring the annular plate into press contact with the clamping ring; and
retraction means for retracting the piston against the resilient force of the compression spring.

5. A tilt device secured onto a work table of a machine tool wherein a spindle head rotatably supporting a tool spindle and the work table to which a workpiece is detachably attached are relatively moved to machine the workpiece with a tool attached to the tool spindle, the tilt device comprising:
a support pedestal secured on the work table;
a drive spindle supported by a front bearing and a rear bearing in the support pedestal rotatably about a pivot axis;
a distributor provided on the axis of the drive spindle for distribution of pressurized oil;
a direct drive motor provided with a stator fixedly fitted in a retention bore which is formed coaxially of the pivot axis between the front bearing and the rear bearing in the support pedestal and a rotor fixedly fitted on the drive spindle;
a tilt table secured to the drive spindle for attaching the workpiece thereto; and
a controller for controlling a relative angular position between the tool and the workpiece by rotating the drive spindle by an operation of the direct drive motor and for rotating the tilt table at a high speed to shake out chips by rotating the direct drive motor at a high speed with the spindle head and the work table kept away in a predetermined period of time in the state that the workpiece is attached on the tilt table, wherein the predetermined period of time is set within a tool change period of time during which the machine tool changes the tool attached to the tool spindle by a tool changer.

\* \* \* \* \*